United States Patent [19]

Martinez et al.

[11] Patent Number: 4,548,066
[45] Date of Patent: Oct. 22, 1985

[54] PRESS WORKPIECE THICKNESS MEASURING SYSTEM AND METHOD

[75] Inventors: Miguel R. Martinez; William J. Mitchell, Jr., both of Mercer County, N.J.

[73] Assignee: RCA Corporation, Princeton, N.J.

[21] Appl. No.: 638,551

[22] Filed: Aug. 7, 1984

[51] Int. Cl.⁴ .................. G01B 5/06; G01N 3/20
[52] U.S. Cl. ........................ 73/1 J; 73/159; 73/849; 364/563
[58] Field of Search ............ 73/159, 432 Z, 849, 73/1 B, 1 J; 364/563

[56] References Cited

U.S. PATENT DOCUMENTS

| | | | |
|---|---|---|---|
| 3,348,440 | 10/1967 | Jensen | 83/58 |
| 3,381,559 | 5/1968 | Lefever et al. | 83/61 |
| 3,470,734 | 10/1969 | Agdur et al. | 73/159 |
| 3,918,302 | 11/1975 | Skelton | 73/1 B |
| 4,095,063 | 6/1978 | Herzhoff | 73/159 |
| 4,205,769 | 6/1980 | Blitchington | 226/24 |
| 4,402,228 | 9/1983 | Eberle | 73/849 |

Primary Examiner—S. Clement Swisher
Attorney, Agent, or Firm—E. M. Whitacre; D. H. Irlbeck; L. L. Hallacher

[57] ABSTRACT

A system for the in press measurement of the thickness of a workpiece includes a force transducer and a displacement transducer. The force transducer is used to detect the contact between the forming tool and the workpiece. The output of the displacement transducer is continually read and recorded at the instant the force transducer indicates the contact between the forming tool and the workpiece. The output of the displacement transducer is correlated to known thicknesses and thus is indicative of the thickness of the unknown specimen.

16 Claims, 6 Drawing Figures

PRESS WORKPIECE THICKNESS MEASURING SYSTEM AND METHOD

BACKGROUND

This invention relates generally to the forming of metal parts and particularly to the in press measurement of the thickness of the workpiece from which parts are formed.

The quality of parts made by forming thin sheets of metal, such as the parts for the electron gun of a color television kinescope, is highly dependent upon the thickness of the material from which the parts are formed. Deviation in the metal thickness from the nominal value results in changes of the forming force and pressure pad force. These variations in forces produce parts for which the bending, spring back and wall thinning are very difficult to predict and compensate. Additionally, changes in the forming forces contribute to excessive wear and fatique of the dies from which the parts are formed, and thus substantially reduce the life of the dies.

Currently, the metal forming industry measures the thickness of the stock based upon a discrete quality control scheme. Typically, samples from lots are selected and the thickness of the samples measured. The entire batch of metal is thus either accepted or rejected based on measurements of the samples. Typically, the samples are selected from the ends of the roll and therefore the sample measurements are not indicative of the thickness of the metal in the middle of the roll. For these reasons, using the sampling method, it is possible to accept a defective roll of material and also to reject an acceptable roll of material. The metal forming industry is starting to measure the thickness of the incoming stock on a continuous basis before the stock enters the die. Typically such measurement is accomplished by a noncontact transducer of the capacitive type. This noncontact type of measurement suffers from a disadvantage in that impurities, or lubricants can change the dielectric and render the measurement inaccurate. Additionally after the metal enters the die, the capacitive transducer provides no information regarding lubricant thickness or impurities that may have adhered to the metal subsequent to the measurement and hence modified the effective thicknesses. For this reason, there is a need for a system for measuring the metal thickness in the die under actual working conditions. The instant invention fulfills this long felt need.

CROSS REFERENCE TO RELATED APPLICATION

This invention can be used with the system described in application Ser. No. 638,557 entitled "SYSTEM AND METHOD FOR THE IN PRESS ADJUSTMENT OF WORKPIECE HOLDING FORCE" filed Aug. 7, 1984 by M. R. Martinez, Z. M. Andrevski and W. J. Mitchell.

SUMMARY

A system for measuring the thickness of a specimen present in a press includes a force transducer for measuring the force of the press against the specimen and providing a force signal representative of the force. A displacement transducer provides a displacement signal representative of the displacement of the forming tool. A calculator means receives the force signal and the displacement signal and provides the specimen thickness in accordance with the displacement signal when the force signal rises above a threshold level in response to contact between the forming tool and the specimen.

DETAILED DESCRIPTION

Figure 1:
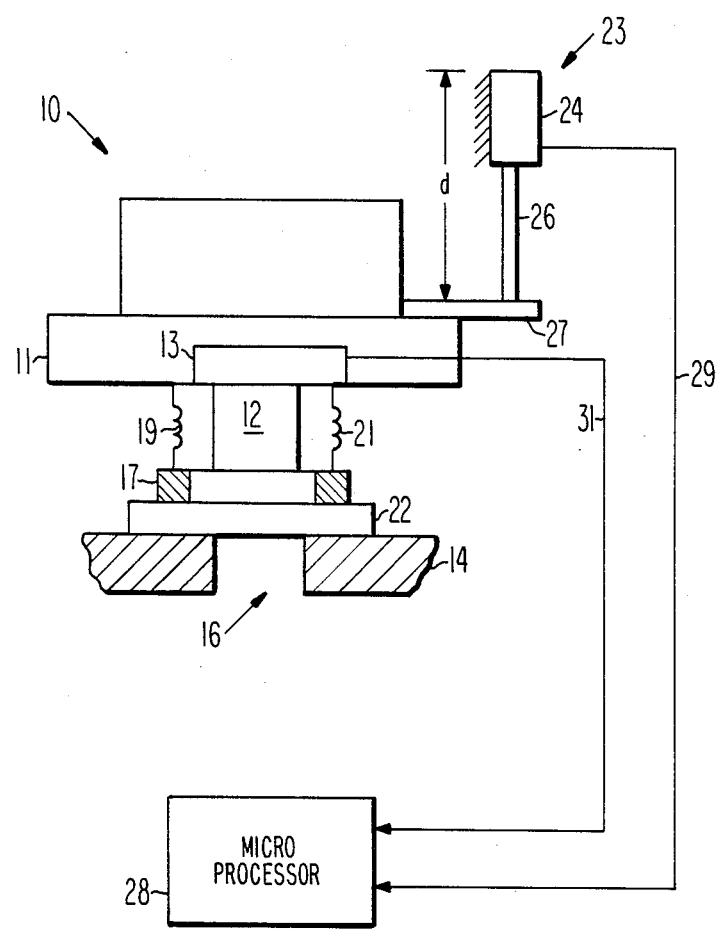
FIG. 1 is a simplified showing of a metal press for forming thin metal parts including the transducers utilized in the claimed invention.

In FIG. 1, a press 10 includes a vertically moveable ram 11 to which is affixed a forming tool 12. Arranged between the forming tool 12 and the ram 11 is a force transducer 13 which in the preferred embodiment is a quartz crystal, although other transducers, such as strain gages, can be used. A die 14, including an aperture 16, is positioned beneath the vertically moveable ram 11. A pressure pad 17 is coupled to the ram 11 by springs 19 and 21. A specimen 22 of material from which a part is to be formed is held against the die 14 by the pressure pad 17. The aperture 16 of the die 14 is dimensioned in accordance with the desired external dimension of the part to be pressed. The dimension of the forming tool 12 is selected in accordance with the desired internal dimension of the part to be pressed taking into consideration the thickness of the material specimen 22.

During the forming of a part, the pressure pad 17 applies a holding force to the specimen 22. The holding force and the force with which the forming tool 12 forms the part are a function of the thickness of the specimen 22. When either the holding force applied to the specimen 22 or the forming force of the forming tool 12 is excessive fracturing of the specimen 22 can occur at the places where the metal deforms, also it is possible to break the forming tool 12 or the die 14. When the holding force is light wrinkles are formed in the part. In either event, a rejected part is usually made. For these reasons, a knowledge of the thickness of the specimen 22 is necessary so that the holding force can be adjusted in accordance with the thickness.

A displacement transducer 23, which in the preferred embodiment is a linear variable differential transformer (LVDT), is permanently positioned a preselected distance d above the ram 11. The LVDT includes a transformer 24 and a core 26 which is fixed to the ram 11 by an appropriate coupling 27. Accordingly, as the ram 11 moves vertically with respect to the specimen 22, the core moves along with the ram 11 and an output voltage indicative of the core 26 displacement is produced by the transformer 24. This displacement signal is applied to a calculator means, in the form of microprocessor 28 in the preferred embodiment described, by a line 29. The output signal of the force transducer 13 is a force signal, in the form of a voltage, and is proportional to the pressure with which the forming tool 12 contacts the specimen 22. The force signal is applied to the microprocessor 28 by a line 31.

Figure 2:
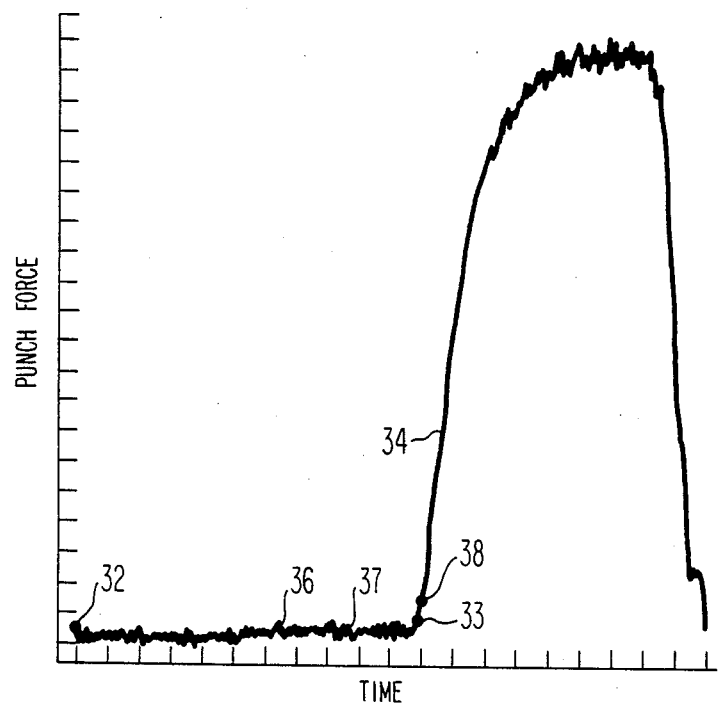
FIG. 2 is the force/time plot showing how the output of the force transducer increases when the die contacts the metal specimen.

The output of the quartz crystal force transducer 13 theoretically is zero under no load. However, because the crystal is arranged between the ram 11 and the forming tool 12, there is a noise output as the ram 11 approaches the specimen 22. This noise level is indicated in FIG. 2 between the two points 32 and 33. At the instant the forming tool 12 contacts the specimen 22, the output of the force transducer 13 increases substantially, as indicated by the steep slope of the curve 34 in FIG. 2. The rapid increase in the output signal of the force transducer 13, therefore, accurately indicates that the forming tool 12 has come into contact with the specimen 22. Accordingly, by correlating the change in the force transducer output with the displacement signal from the displacement transducer 23, the displacement of the ram 11 is known and can be used to accurately calculate the thickness of the specimen 22. Accordingly, the output of the LVDT 23 is continually applied to the microprocessor 28 along with the output of the force transducer 13 and the reading of the displacement transducer 23 at the time of the contact between the forming tool 12 and specimen 22 is used as a measurement of the thickness of the specimen 22.

The no load output of the force transducer 13 is noisy and for this reason, it is possible for a spurious noise output to yield a false indication that the specimen 22 has been contacted. In FIG. 2, some of the noise spikes, such as 36 and 37, are relatively high and, the system must be prevented from giving an indication of contact between the forming tool 12 and the specimen 22 in response to such noise spikes. This is accomplished by selecting a theshold level 38 which is above the mean value of the noise spikes between the points 32 and 33. Accordingly, the force transducer 13 and the system are calibrated prior to the making of any actual thickness measurements. The calibration is accomplished by taking a large number n of no load readings from the force transducer 13. The mean value $\mu$ of the no load noise readings and the variant $\beta^2$ are calculated using the well known equations.

$$\mu = \frac{\sum_{1}^{n} x_i}{n} \quad (1)$$

and $$\beta_n^2 = \sum_{1}^{n} \frac{(x_i - \mu)^2}{n - 1} \quad (2)$$

where:
$x_1$ = The individual no load noise readings
$\mu$ = mean noise level
n = number of no load noise readings The variant $\beta_n$ is then used to calculate the threshold level T (38 in FIG. 2) in accordance with the expression $$T = \mu + K\beta_n \quad (3)$$

where:
K = a system constant
$\beta_n$ = noise standard deviation
$\mu$ = mean noise level.

Figure 3:
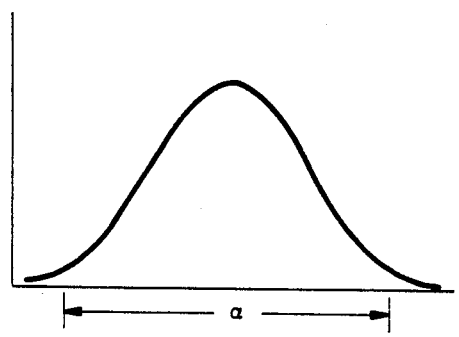
FIG. 3 is a bell curved distribution showing how the confidence factor of the invention is selected.

In the computation of the threshold level T, a system constant K is utilized. This constant is dependent upon the probability that all of the noise readings taken between the points 32 and 33 are below the calculated threshold level 38. Thus, in FIG. 3, the system confidence factor K is shown to be selected at a given confidence level $\alpha$. That is, there is an $\alpha$ percent chance that the noise reading of the force transducer is above the calculated threshold level 38 before the forming tool 12 contacts the specimen 22.

Figure 4A:
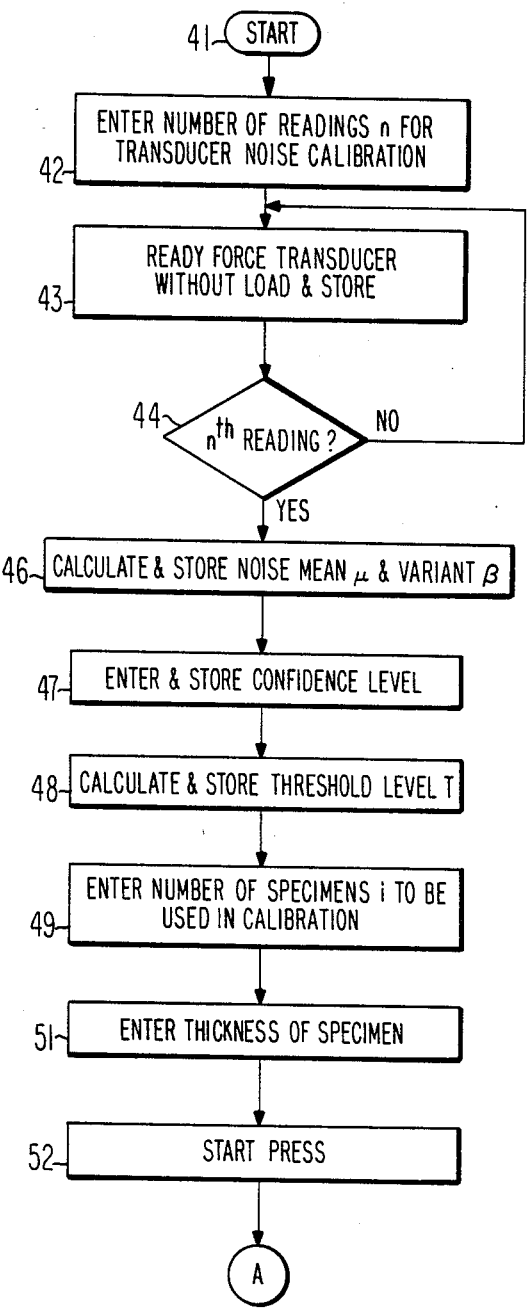
FIGS. 4a, 4b and 4c are flow charts of a preferred embodiment of a calculator means for determining the specimen thickness.
Figure 4B:
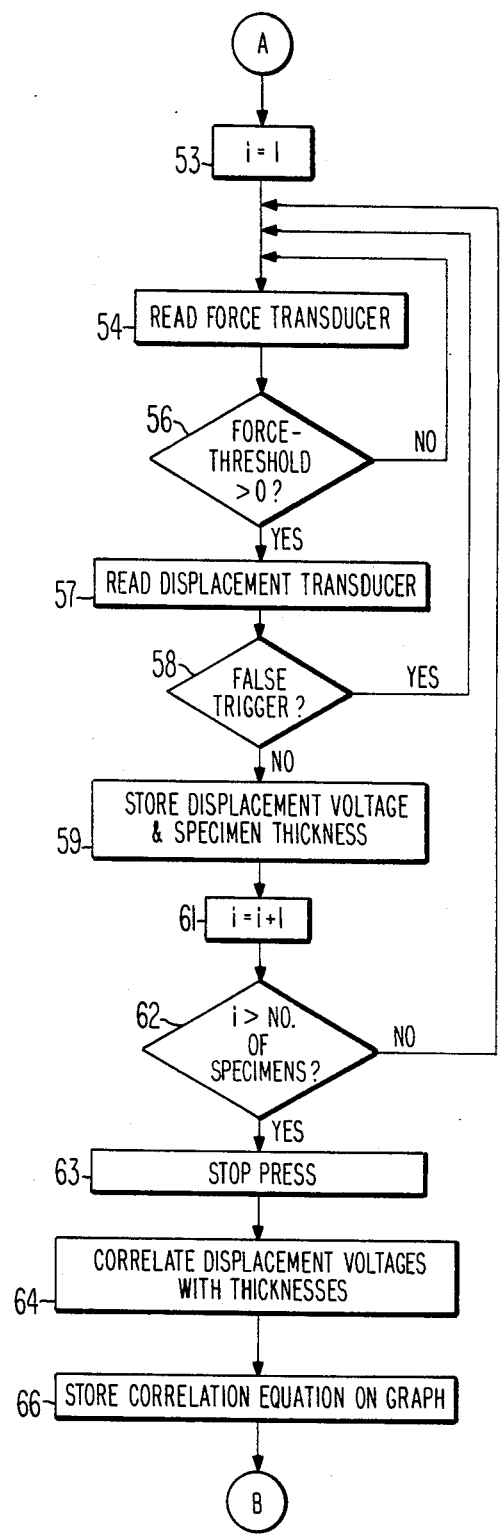
Figure 4C:
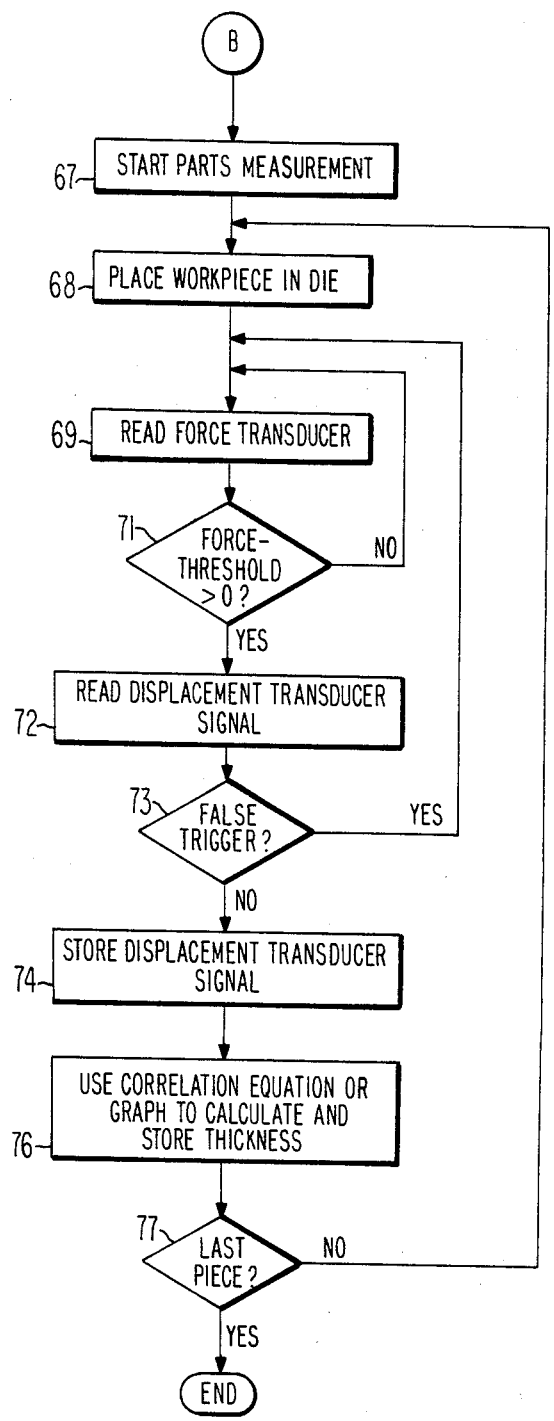

FIGS. 4a, 4b and 4c are a preferred embodiment of the microprocessor used for the calculator means 28 of FIG. 1. FIGS. 4a and 4b are the system calibration prior to any part forming and FIG. 4c is the specimen thickness measurement. In FIG. 4a, the calibration process starts at step 41 and at step 42 the number n of no load readings of the output of the force transducer 13 is set into the system. This number is chosen to enhance the probability of accuracy while simultaneously avoiding processing an unduly large amount of data. Thus, for example, in the order of 100 to 150 readings are selected. At step 43, the force transducer 13 is read without load and the output voltage is stored. At decision 44, when the nth (last) reading has not been recorded, step 43 is repeated and another no load voltage is stored. This operation continues until the number of readings set into the system at step 42 is made. Step 46 is entered and the system noise mean $\mu$ and variant $B^3$ are calculated and stored in accordance with the summation formulae (1) and (2) hereinabove.

After the noise mean and variant are calculated, the confidence level $\alpha$ is entered at step 47. This is the utilization of FIG. 3 to assure that a selected percentage of the noise levels fall below the threshold level. The system threshold level T is calculated at step 48 in accordance with equation (3) hereinabove.

At step 49, the number of sample specimens 22 to be used in the calibration process is entered into the system. In calibrating the system, specimens of known thickness are utilized to calibrate the displacement transducer 23. Such calibration is necessary because the characteristics of individual displacement transducers can vary so that the output voltage of various LVDT's 23 for a particular thickness can vary. By recording the output voltage of a particular LVDT when a specimen of known thickness is contacted, the voltage is correlated to the known thickness and the accuracy of the system is substantially improved. A plurality of displacement voltage readings can be taken for each specimen thickness and standard correlation techniques used to accurately correlate the readings with the known thickness.

The thickness of the sample specimen is entered into the system at step 51 and at step 52 the vertical motion of the forming tool 12 toward the specimen is initiated. In FIG. 4b, at 53 the number i of the specimen being calibrated is noted and at step 54 the output voltage of the force transducer 13 is read. At decision 56, the force transducer reading is compared with the calculated threshold value T. The output of the force transducer is continually read until the force reading exceeds the threshold level. When the force transducer output reading exceeds the calculated threshold value step 57 is entered and the output voltage of the displacement transducer 23 is read and stored.

At step 58, a comparison is made to determine whether or not the output of the force transducer was a false trigger in the form of a noise pulse rising above the threshold level T. This step enhances the accuracy of the system by picking up the remaining percentage which is excluded in the confidence level. $\alpha$ described with respect to FIG. 3. The output value of the displacement transducer 23 at full displacement is known to be a particular voltage, for example 10 volts. Accordingly, at step 58, the actual displacement output voltage from the transducer 23 is compared to the known expected full displacement voltage. When the actual output reading is very close to the expected voltage there is a very high probability that a valid trigger was received from the force transducer 13. However, when there is a substantial variation between the actual displacement voltage and the expected displacement voltage, there is a very high probability that a false trigger was indicated. When such a false trigger is indicated the force transducer 13 is continued to be read and steps 54, 56, 57 and 58 are repeated.

When the decision 58 indicates that a valid trigger was received, step 59 is entered to store both the output signals of the displacement transducer 23 and the known thickness of the specimen 22. Thus, the displacement transducer output for a known specimen thickness is known at this time. The counting step 61 is then entered to increment the system for the correlation of the voltages with a specimen of the next thickness. Accordingly, a new specimen is placed into the die 14. At decision 62, when the desired number of specimens has not been calibrated, the step 54 is returned to correlate the next specimen thickness with the output signal of the displacement transducer 23. At decision, step 62 when the last specimen has been calibrated, the press is stopped at step 63. Step 64 and 66 are entered to correlate the displacement voltages with the thicknesses of the specimens and to store the correlation equation or graph. The output of LVDT varies linearly as the core 26 moves with respect to the transformer 24. Accordingly, the correlation plot of the measurements is a straight line and the calibration procedure yields the slope of the line. For this reason, at step 66 the measured points can be used in the same manner a graph is used, or the slope can be determined and the equation for a straight line used to calculate the thickness when an unknown thickness specimen yields a displacement transducer output. In either even, when specimens of unknown thicknesses are subsequently placed on the die 14, the output signal of the displacement transducer 23 is read and either compared to the stored correlation graph or the stored line slope is used to calculate the thickness.

In FIG. 4c, the actual measurement of the thickness of the specimen to be used in forming a part is made. The measurement starts at step 67 and at step 68 a specimen 22 is placed onto the die 14 and clamped by the pressure pad 17. Vertical motion of the forming tool 12 toward the specimen 22 is then initiated and at step 69, the force transducer 13 output is continuously read. At decision 71, the force transducer 13 continues to be read until the output indicates that the force exceeds the threshold level T, as indicated by 38 in FIG. 2. The instant that the threshold level T exceeds the voltage output of the displacement transducer 23 is read at step 72. At step 73, an investigation is made to verify that a false trigger has not been received. Thus, at decision 73 the voltage output of the displacement transducer 23 is compared to the known full displacement voltage to verify that the indicated voltage is substantially equal to the expected voltage. When a valid trigger is indicated, step 74 is entered to store the displacement transducer output and step 76 is then entered to compare the displacement transducer output with the stored correlation graph or equation and the thickness of the unknown specimen 22 is stored. At decision 77, when the last piece has not been measured, step 68 is reentered and a new specimen of unknown thickness is placed onto the dye 14 and the measuring process repeated. The measured thickness can than be used to either manually or automatically adjust the holding and forming pressures of the press to avoid forming defective parts and to protect the die from possible breakage due to excessive specimen thickness.

What is claimed is:

1. A system for measuring the thickness of a specimen present in a press for forming said specimen into a part comprising:
    a force transducer for measuring the force of a forming tool within said press against said specimen and providing a force signal representative of said force;
    a displacement transducer for providing a displacement signal representative of the displacement of said forming tool;
    calculator means for receiving said force signal and said displacement signal and providing said specimen thickness in accordance with said displacement signal when said force signal rises above a threshold level in response to contact between said forming tool and said specimen.

2. The system of claim 1 wherein said calculator means includes means for determining a mean noise level of said force transducer in response to a plurality of no load readings from said force transducer.

3. The system of claim 2 wherein said calculator means includes means for determining a noise variance $\beta^2 n$ in accordance with the expressions:

$$\mu = \frac{\sum\limits_{1}^{n} x_i}{n}$$

and $$\beta_n^2 = \sum\limits_{1}^{n} \frac{(x_i - \mu)^2}{n - 1}$$

where:
  x = the sum of the noise samples
  $\mu$ = said mean noise level
  n = number of no load noise readings.

4. The system of claim 3 wherein said calculator means includes means for determining said threshold level T, in accordance with the expression:

$$T = m + K\beta_n$$

where:
  K = a system constant
  $\beta_n$ = said noise factor
  $\mu$ = said mean noise.

5. The system of claim 4 wherein said system constant K is a confidence factor selected to insure that a selected percentage of said noise readings is below said threshold level.

6. The system of claim 5 wherein said calculator means includes means for correlating displacement signals with thickness measurements of sample specimens to calibrate said system and to plot a displacement/thickness graph for use in thickness measuring.

7. The system of claim 6 wherein said force transducer is a quartz crystal.

8. The system of claim 7 wherein said displacement transducer is a linear variable differential transformer.

9. The system of claim 1 wherein said calculator means includes means for correlating displacement signals with thickness measurements of sample specimens to calibrate said system and to plot a displacement/thickness graph for use in thickness measuring.

10. The system of claim 9 wherein said force transducer is a quartz crystal.

11. The system of claim 10 wherein said displacement transducer is a linear variable differential transformer.

12. The system of claim 9 wherein said threshold level is higher than a mean no load noise level of said force transducer.

13. A method of measuring the thickness of a workpiece present in a press including the steps of:
   detecting contact between said workpiece and the forming tool of said press with a force transducer to provide a force signal;
   detecting the displacement of said forming tool with a displacement transducer to provide a displacement signal;
   utilizing said displacement signal to provide a specimen thickness signal when said force signal rises above a threshold level.

14. The method of claim 13 further including the steps of determining the no-load noise level of said force transducer and setting said threshold level above said noise level.

15. The method of claim 14 wherein said noise level is determined utilizing a number of no-load transducer readings in accordance with the expressions:

$$\beta_n^2 = \sum_1^n \frac{(x_i - \mu)^2}{n - 1}$$

where:
x = the sum of the noise samples
$\mu$ = mean noise level
n = number of no load noise readings.

16. The method of claim 15 further including the step of establishing said threshold level in accordance with the expression:

$$T = \mu + K\beta_n$$

where:
K = a system constant
$\beta_n$ = said noise factor
$\mu$ = mean noise level.

* * * * *